US011809586B2

(12) United States Patent
Carru et al.

(10) Patent No.: US 11,809,586 B2
(45) Date of Patent: *Nov. 7, 2023

(54) SHARED OBJECT DISCOVERY TECHNIQUES

(71) Applicant: Snowflake Inc., Bozeman, MT (US)

(72) Inventors: Damien Carru, New York, NY (US); Jeremy Yujui Chen, Waterloo (CA); Pui Kei Johnston Chu, Unionville (CA); Benoit Dageville, San Carlos, CA (US); Subramanian Muralidhar, Mercer Island, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/980,427

(22) Filed: Nov. 3, 2022

(65) Prior Publication Data

US 2023/0135712 A1 May 4, 2023

Related U.S. Application Data

(63) Continuation of application No. 17/580,341, filed on Jan. 20, 2022, now Pat. No. 11,520,920.

(60) Provisional application No. 63/273,770, filed on Oct. 29, 2021.

(51) Int. Cl.
*G06F 7/00* (2006.01)
*G06F 16/00* (2019.01)
*G06F 21/62* (2013.01)
*G06F 16/21* (2019.01)
*G06F 16/2455* (2019.01)

(52) U.S. Cl.
CPC ........ *G06F 21/6218* (2013.01); *G06F 16/213* (2019.01); *G06F 16/24552* (2019.01)

(58) Field of Classification Search
None
See application file for complete search history.

(56) References Cited

U.S. PATENT DOCUMENTS

| | | | |
|---|---|---|---|
| 2010/0235623 A1* | 9/2010 | Simpson | G06Q 10/06 713/168 |
| 2016/0255089 A1* | 9/2016 | Diestler | G06F 21/6236 726/4 |
| 2017/0075919 A1* | 3/2017 | Bose | G06F 21/00 |
| 2018/0081959 A1* | 3/2018 | Chatterjee | G06F 16/24552 |
| 2018/0152460 A1* | 5/2018 | Lin | G06F 16/9566 |

* cited by examiner

*Primary Examiner* — Tuan A Pham
(74) *Attorney, Agent, or Firm* — Womble Bond Dickinson (US) LLP

(57) ABSTRACT

A consumer account may invoke an operation referencing a set of shared objects stored within a database of a provider account using an imported database that makes the set of shared objects available within the consumer account. A call context of the operation may be updated to cache the imported database, which references a share created from the provider account database, the share having grants to the set of shared objects. One or more database level objects may be discovered in a context of the share and each role granted to the share may be obtained based on the one or more database level objects. Whether any role granted to the share has access to any of the set of shared objects may be determined and the operation may be executed for each of the set of shared objects to which any role granted to the share has access.

27 Claims, 8 Drawing Sheets

SHARED OBJECT DISCOVERY TECHNIQUES

CROSS REFERENCE TO RELATED APPLICATIONS

This Application is a continuation of U.S. application Ser. No. 17/580,341, filed Jan. 20, 2022 and entitled SHARED OBJECT DISCOVERY TECHNIQUES, which claims priority to U.S. Provisional Application No. 63/273,770, which was filed on Oct. 29, 2021, and is entitled SHARED OBJECT DISCOVERY TECHNIQUES, the contents of which are hereby incorporated by reference.

TECHNICAL FIELD

The present disclosure relates to data sharing platforms, and particularly to discovery of shared objects within a data sharing platform.

BACKGROUND

Databases are widely used for data storage and access in computing applications. Databases may include one or more tables that include or reference data that can be read, modified, or deleted using queries. Databases may be used for storing and/or accessing personal information or other sensitive information. Secure storage and access of database data may be provided by encrypting and/or storing data in an encrypted form to prevent unauthorized access. In some cases, data sharing may be desirable to let other parties perform queries against a set of data.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1A:
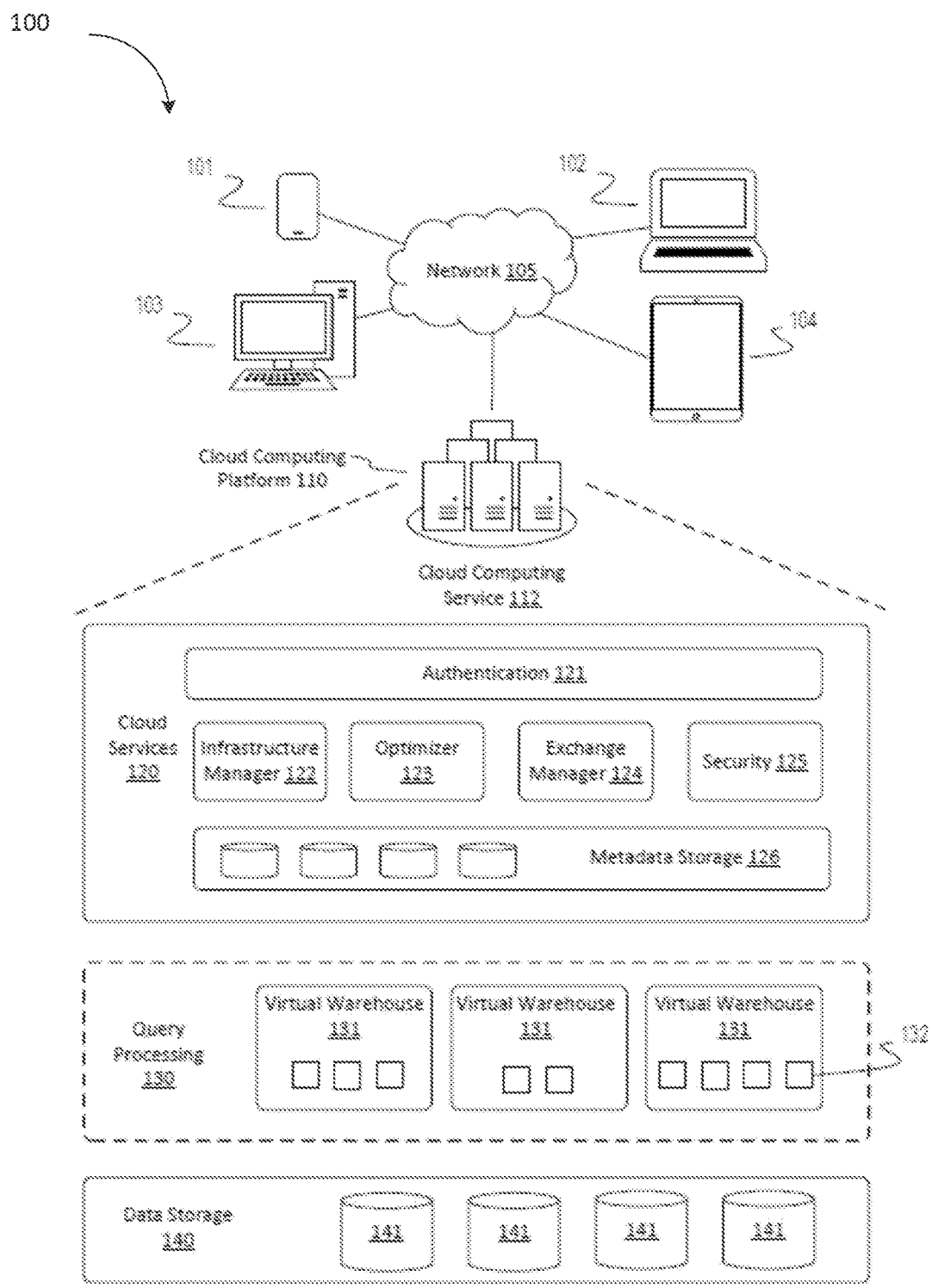
FIG. 1A is a block diagram depicting an example computing environment in which the methods disclosed herein may be implemented, in accordance with some embodiments of the present invention.

Data providers often have data assets that are cumbersome to share. A data asset may be data that is of interest to another entity. For example, a large online retail company may have a data set that includes the purchasing habits of millions of consumers over the last ten years. This data set may be large. If the online retailer wishes to share all or a portion of this data with another entity, the online retailer may need to use old and slow methods to transfer the data, such as a file-transfer-protocol (FTP), or even copying the data onto physical media and mailing the physical media to the other entity. This has several disadvantages. First, it is slow as copying terabytes or petabytes of data can take days. Second, once the data is delivered, the provider cannot control what happens to the data. The recipient can alter the data, make copies, or share it with other parties. Third, the only entities that would be interested in accessing such a large data set in such a manner are large corporations that can afford the complex logistics of transferring and processing the data as well as the high price of such a cumbersome data transfer. Thus, smaller entities (e.g., "mom and pop" shops) or even smaller, more nimble cloud-focused startups are often priced out of accessing this data, even though the data may be valuable to their businesses. This may be because raw data assets are generally too unpolished and full of potentially sensitive data to simply outright sell/provide to other companies. Data cleaning, de-identification, aggregation, joining, and other forms of data enrichment need to be performed by the owner of data before it is shareable with another party. This is time-consuming and expensive. Finally, it is difficult to share data assets with many entities because traditional data sharing methods do not allow scalable sharing for the reasons mentioned above. Traditional sharing methods also introduce latency and delays in terms of all parties having access to the most recently-updated data.

Private and public data exchanges may allow data providers to more easily and securely share their data assets with other entities. A public data exchange (also referred to herein as a "Snowflake data marketplace," or a "data marketplace") may provide a centralized repository with open access where a data provider may publish and control live and read-only data sets to thousands of consumers. A private data exchange (also referred to herein as a "data exchange") may be under the data provider's brand, and the data provider may control who can gain access to it. The data exchange may be for internal use only, or may also be opened to consumers, partners, suppliers, or others. The data provider may control what data assets are listed as well as control who has access to which sets of data. This allows for a seamless way to discover and share data both within a data provider's organization and with its business partners.

The data exchange may be facilitated by a cloud computing service such as the SNOWFLAKE™ cloud computing service, and allows data providers to offer data assets directly from their own online domain (e.g., website) in a private online marketplace with their own branding. The data exchange may provide a centralized, managed hub for an entity to list internally or externally-shared data assets, inspire data collaboration, and also to maintain data governance and to audit access. With the data exchange, data providers may be able to share data without copying it between companies. Data providers may invite other entities to view their data listings, control which data listings appear in their private online marketplace, control who can access data listings and how others can interact with the data assets connected to the listings. This may be thought of as a "walled garden" marketplace, in which visitors to the garden must be approved and access to certain listings may be limited.

As an example, Company A may be a consumer data company that has collected and analyzed the consumption habits of millions of individuals in several different categories. Their data sets may include data in the following categories: online shopping, video streaming, electricity consumption, automobile usage, internet usage, clothing purchases, mobile application purchases, club memberships, and online subscription services. Company A may desire to offer these data sets (or subsets or derived products of these data sets) to other entities. For example, a new clothing brand may wish to access data sets related to consumer clothing purchases and online shopping habits. Company A may support a page on its website that is or functions substantially similar to a data exchange, where a data consumer (e.g., the new clothing brand) may browse, explore, discover, access and potentially purchase data sets directly from Company A. Further, Company A may control: who can enter the data exchange, the entities that may view a particular listing, the actions that an entity may take with respect to a listing (e.g., view only), and any other suitable action. In addition, a data provider may combine its own data with other data sets from, e.g., a public data exchange (also referred to as a "data marketplace"), and create new listings using the combined data.

A data exchange may be an appropriate place to discover, assemble, clean, and enrich data to make it more monetizable. A large company on a data exchange may assemble data from across its divisions and departments, which could become valuable to another company. In addition, participants in a private ecosystem data exchange may work together to join their datasets together to jointly create a useful data product that any one of them alone would not be able to produce. Once these joined datasets are created, they may be listed on the data exchange or on the data marketplace.

Sharing data may be performed when a data provider creates a share object (hereinafter referred to as a share) of a database in the data provider's account and grants the share access to particular objects (e.g., tables, secure views, and secure user-defined functions (UDFs)) of the database. Then, a read-only database may be created using information provided in the share. Access to this database may be controlled by the data provider. A "share" encapsulates all of the information required to share data in a database. A share may include at least three pieces of information: (1) privileges that grant access to the database(s) and the schema containing the objects to share, (2) the privileges that grant access to the specific objects (e.g., tables, secure views, and secure UDFs), and (3) the consumer accounts with which the database and its objects are shared. The consumer accounts with which the database and its objects are shared may be indicated by a list of references to those consumer accounts contained within the share. Only those consumer accounts that are specifically listed in the share may be allowed to look up, access, and/or import from this share. By modifying the list of references of other consumer accounts, the share can be made accessible to more accounts or be restricted to fewer accounts.

In some embodiments, each share contains a single role. Grants between this role and objects define what objects are being shared and with what privileges these objects are shared. The role and grants may be similar to any other role and grant system in the implementation of role-based access control. By modifying the set of grants attached to the role in a share, more objects may be shared (by adding grants to the role), fewer objects may be shared (by revoking grants from the role), or objects may be shared with different privileges (by changing the type of grant, for example to allow write access to a shared table object that was previously read-only). In some embodiments, shares in a provider account may be imported into the target consumer account using alias objects and cross-account role grants.

When data is shared, no data is copied or transferred between users. Sharing is accomplished through the cloud computing services of a cloud computing service provider such as SNOWFLAKE™. Shared data may then be used to process SQL queries, possibly including joins, aggregations, or other analysis. In some instances, a data provider may define a share such that "secure joins" are permitted to be performed with respect to the shared data. A secure join may be performed such that analysis may be performed with respect to shared data but the actual shared data is not accessible by the data consumer (e.g., recipient of the share).

A data exchange may also implement role-based access control to govern access to objects within consumer accounts using account level roles and grants. In one embodiment, account level roles are special objects in a consumer account that are assigned to users. Grants between these account level roles and database objects define what privileges the account level role has on these objects. For example, a role that has a usage grant on a database can "see" this database when executing the command "show databases"; a role that has a select grant on a table can read from this table but not write to the table. The role would need to have a modify grant on the table to be able to write to it.

Current approaches to discovering shared objects work well in numerous scenarios, however there are some scenarios where they may result in errors. One example of such a scenario is where a provider account creates multiple shares that are all bound to the same shared database and a consumer account creates multiple imported databases from those multiple shares. In this scenario, shared objects may appear in the wrong imported database because when discovering shared objects (using commands such as SHOW), objects shared via different shares will all appear under the same local imported database bound to a given share (as the ID of a shared database can only be mapped to a single imported database name). In addition, a share may not be authorized to access an object shared via another share and as a result, during name resolution of the object, the objects may be referenced using the wrong imported database. This occurs because the current approach to discovering a shared object takes steps to ensure that a consumer account is authorized to see the object, but not that a specific share is authorized to see the object.

Embodiments of the present disclosure provide an enhanced method of discovering shared objects that utilizes share authorization in addition to role authorization when a role is attempting to discover shared objects. A consumer account may invoke an operation referencing shared objects within a provider account using an imported database as a current session database. In response, a call context of the operation may be updated to save the imported database as the current session database and the imported database may be mapped to a first share and to a shared database. A first authorization based on whether the role has access privileges to the shared objects may be performed. The shared database may be used to identify one or more schemas and the one or more schemas may be used to identify shares with which the imported database is associated. A secondary authorization may be performed based on the permissions that the shares to which the imported database is associated have on the shared objects.

FIG. 1A is a block diagram of an example computing environment 100 in which the systems and methods disclosed herein may be implemented. In particular, a cloud computing platform 110 may be implemented, such as AMAZON WEB SERVICES™ (AWS), MICROSOFT AZURE™, GOOGLE CLOUD™, or the like. As known in the art, a cloud computing platform 110 provides computing resources and storage resources that may be acquired (purchased) or leased and configured to execute applications and store data.

The cloud computing platform 110 may host a cloud computing service 112 that facilitates storage of data on the cloud computing platform 110 (e.g. data management and access) and analysis functions (e.g. SQL queries, analysis), as well as other computation capabilities (e.g., secure data sharing between users of the cloud computing platform 110). The cloud computing platform 110 may include a three-tier architecture: data storage 140, query processing 130, and cloud services 120.

Data storage 140 may facilitate the storing of data on the cloud computing platform 110 in one or more cloud databases 141. Data storage 140 may use a storage service such as AMAZON S3™ to store data and query results on the cloud computing platform 110. In particular embodiments, to load data into the cloud computing platform 110, data tables may be horizontally partitioned into large, immutable files which may be analogous to blocks or pages in a traditional database system. Within each file, the values of each attribute or column are grouped together and compressed using a scheme sometimes referred to as hybrid columnar. Each table has a header which, among other metadata, contains the offsets of each column within the file.

In addition to storing table data, data storage 140 facilitates the storage of temp data generated by query operations (e.g., joins), as well as the data contained in large query results. This may allow the system to compute large queries without out-of-memory or out-of-disk errors. Storing query results this way may simplify query processing as it removes the need for server-side cursors found in traditional database systems.

Query processing 130 may handle query execution within elastic clusters of virtual machines, referred to herein as virtual warehouses or data warehouses. Thus, query processing 130 may include one or more virtual warehouses 131, which may also be referred to herein as data warehouses. The virtual warehouses 131 may be one or more virtual machines operating on the cloud computing platform 110. The virtual warehouses 131 may be compute resources that may be created, destroyed, or resized at any point, on demand. This functionality may create an "elastic" virtual warehouse that expands, contracts, or shuts down according to the user's needs. Expanding a virtual warehouse involves generating one or more compute nodes 132 to a virtual warehouse 131. Contracting a virtual warehouse involves removing one or more compute nodes 132 from a virtual warehouse 131. More compute nodes 132 may lead to faster compute times. For example, a data load which takes fifteen hours on a system with four nodes might take only two hours with thirty-two nodes.

Cloud services 120 may be a collection of services that coordinate activities across the cloud computing service 112. These services tie together all of the different components of the cloud computing service 112 in order to process user requests, from login to query dispatch. Cloud services 120 may operate on compute instances provisioned by the cloud computing service 112 from the cloud computing platform 110. Cloud services 120 may include a collection of services that manage virtual warehouses, queries, transactions, data exchanges, and the metadata associated with such services, such as database schemas, access control information, encryption keys, and usage statistics. Cloud services 120 may include, but not be limited to, authentication engine 121, infrastructure manager 122, optimizer 123, exchange manager 124, security engine 125, and metadata storage 126.

Figure 1B:
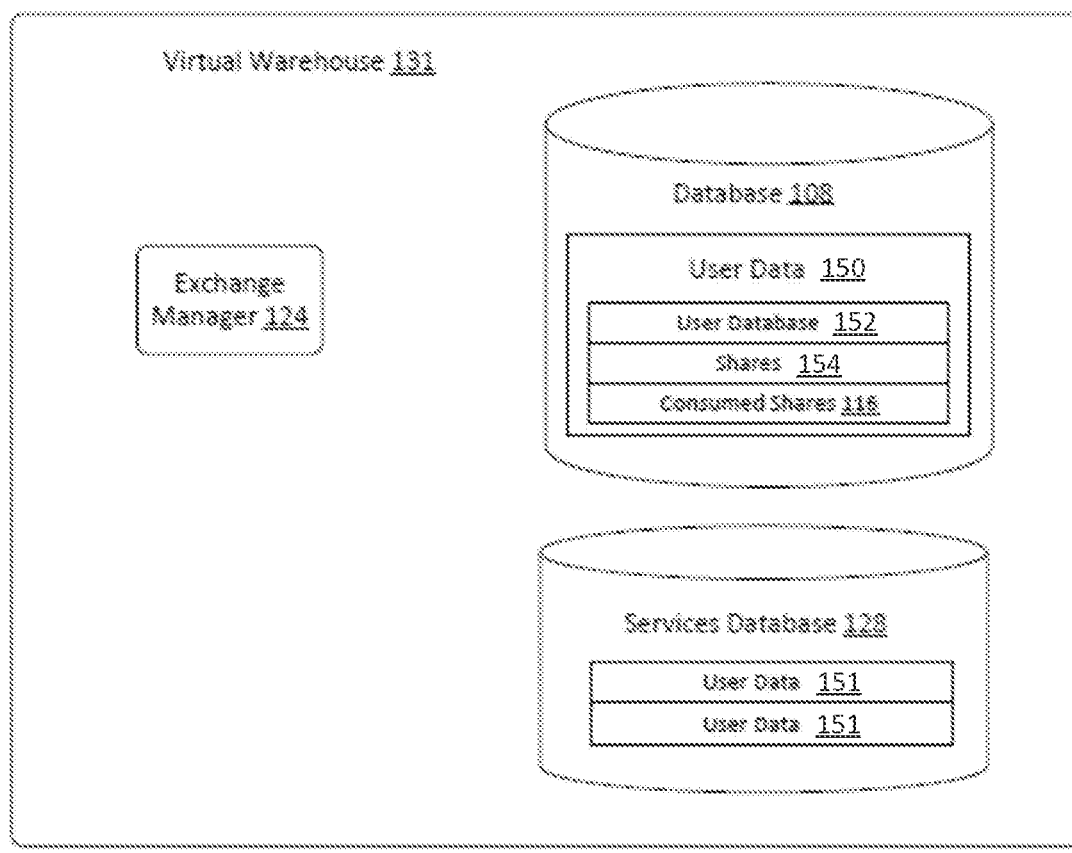
FIG. 1B is a block diagram illustrating an example virtual warehouse, in accordance with some embodiments of the present invention.

FIG. 1B is a block diagram illustrating an example virtual warehouse 131. The exchange manager 124 may facilitate the sharing of data between data providers and data consumers, using, for example, a data exchange. For example, cloud computing service 112 may manage the storage and access of a database 108. The database 108 may include various instances of user data 150 for different users, e.g. different enterprises or individuals. The user data 150 may include a user database 152 of data stored and accessed by that user. The user database 152 may be subject to access controls such that only the owner of the data is allowed to change and access the user database 152 upon authenticating with the cloud computing service 112. For example, data may be encrypted such that it can only be decrypted using decryption information possessed by the owner of the data. Using the exchange manager 124, specific data from a user database 152 that is subject to these access controls may be shared with other users in a controlled manner according to the methods disclosed herein. In particular, a user may specify shares 154 that may be shared in a public or data exchange in an uncontrolled manner or shared with specific other users in a controlled manner as described above. A "share" encapsulates all of the information required to share data in a database. A share may include at least three pieces of information: (1) privileges that grant access to the database(s) and the schema containing the objects to share, (2) the privileges that grant access to the specific objects (e.g., tables, secure views, and secure UDFs), and (3) the consumer accounts with which the database and its objects are shared. When data is shared, no data is copied or transferred between users. Sharing is accomplished through the cloud services 120 of cloud computing service 112.

Sharing data may be performed when a data provider creates a share of a database in the data provider's account and grants access to particular objects (e.g., tables, secure views, and secure user-defined functions (UDFs)). Then a read-only database may be created in the consumer account (also referred to herein as an imported database) using information provided in the share. Access to the content of the database may be controlled by the data provider while access to the imported database created in the consumer account may be controlled by the consumer.

Shared data may then be used to process SQL queries, possibly including joins, aggregations, or other analysis. In some instances, a data provider may define a share such that "secure joins" are permitted to be performed with respect to the shared data. A secure join may be performed such that analysis may be performed with respect to shared data but the actual shared data is not accessible by the data consumer (e.g., recipient of the share). A secure join may be performed as described in U.S. application Ser. No. 16/368,339, filed Mar. 18, 2019.

User devices 101-104, such as laptop computers, desktop computers, mobile phones, tablet computers, cloud-hosted computers, cloud-hosted serverless processes, or other computing processes or devices may be used to access the virtual warehouse 131 or cloud service 120 by way of a network 105, such as the Internet or a private network.

In the description below, actions are ascribed to users, particularly consumers and providers. Such actions shall be understood to be performed with respect to devices 101-104 operated by such users. For example, notification to a user may be understood to be a notification transmitted to devices 101-104, an input or instruction from a user may be understood to be received by way of the user's devices 101-104, and interaction with an interface by a user shall be understood to be interaction with the interface on the user's devices 101-104. In addition, database operations (joining, aggregating, analysis, etc.) ascribed to a user (consumer or provider) shall be understood to include performing of such actions by the cloud computing service 112 in response to an instruction from that user.

Figure 2:
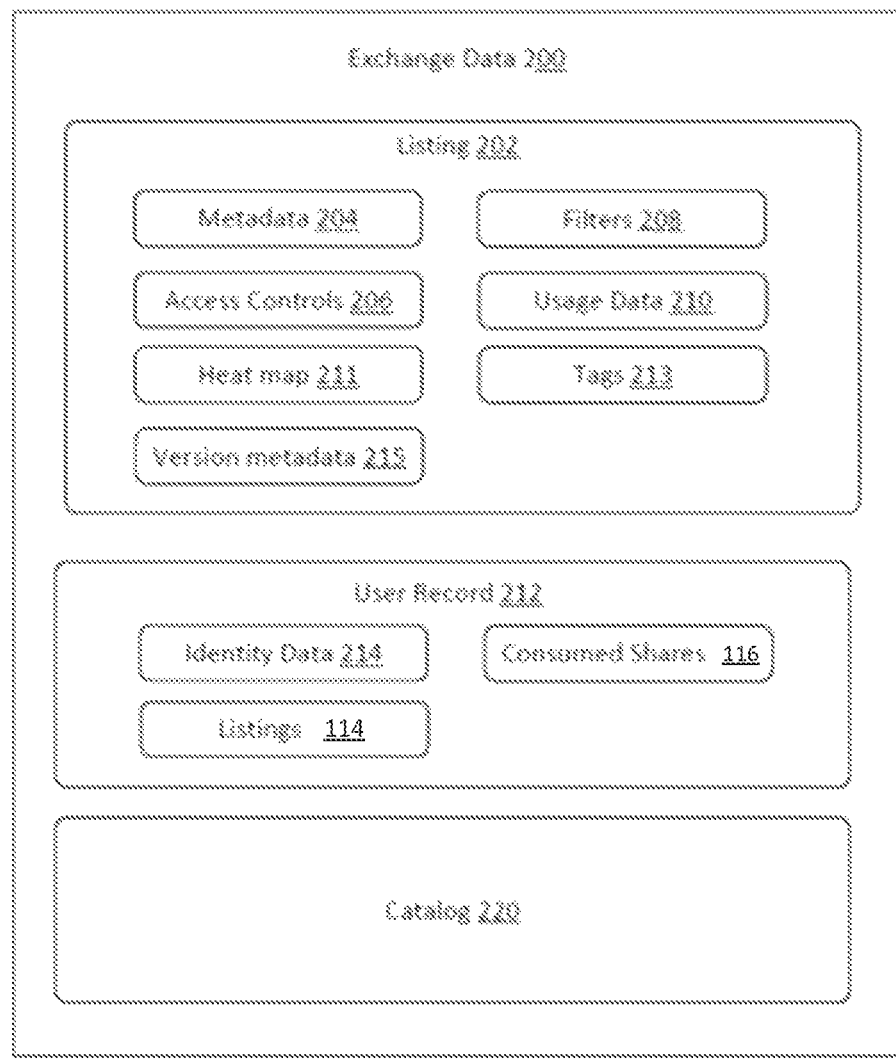
FIG. 2 is a schematic block diagram of data that may be used to implement a public or private data exchange, in accordance with some embodiments of the present invention.

FIG. 2 is a schematic block diagram of data that may be used to implement a public or data exchange in accordance with an embodiment of the present invention. The exchange manager 124 may operate with respect to some or all of the illustrated exchange data 200, which may be stored on the platform executing the exchange manager 124 (e.g., the cloud computing platform 110) or at some other location. The exchange data 200 may include a plurality of listings 202 describing data that is shared by a first user ("the provider"). The listings 202 may be listings in a data exchange or in a data marketplace. The access controls, management, and governance of the listings may be similar for both a data marketplace and a data exchange.

A listing 202 may include metadata 204 describing the shared data. The metadata 204 may include some or all of the following information: an identifier of the provider of the shared data, a URL associated with the provider, a name of the share, a name of tables, a category to which the shared data belongs, an update frequency of the shared data, a catalog of the tables, a number of columns and a number of rows in each table, as well as name for the columns. The metadata 204 may also include examples to aid a user in using the data. Such examples may include sample tables that include a sample of rows and columns of an example table, example queries that may be run against the tables, example views of an example table, example visualizations (e.g., graphs, dashboards) based on a table's data. Other information included in the metadata 204 may be metadata for use by business intelligence tools, text description of data contained in the table, keywords associated with the table to facilitate searching, a link (e.g., URL) to documentation related to the shared data, and a refresh interval indicating how frequently the shared data is updated along with the date the data was last updated.

The listing 202 may include access controls 206, which may be configurable to any suitable access configuration. For example, access controls 206 may indicate that the shared data is available to any member of the private exchange without restriction (an "any share" as used elsewhere herein). The access controls 206 may specify a class of users (members of a particular group or organization) that are allowed to access the data and/or see the listing. The access controls 206 may specify that a "point-to-point" share (see discussion of FIG. 4) in which users may request access but are only allowed access upon approval of the provider. The access controls 206 may specify a set of user identifiers of users that are excluded from being able to access the data referenced by the listing 202.

Figure 4:
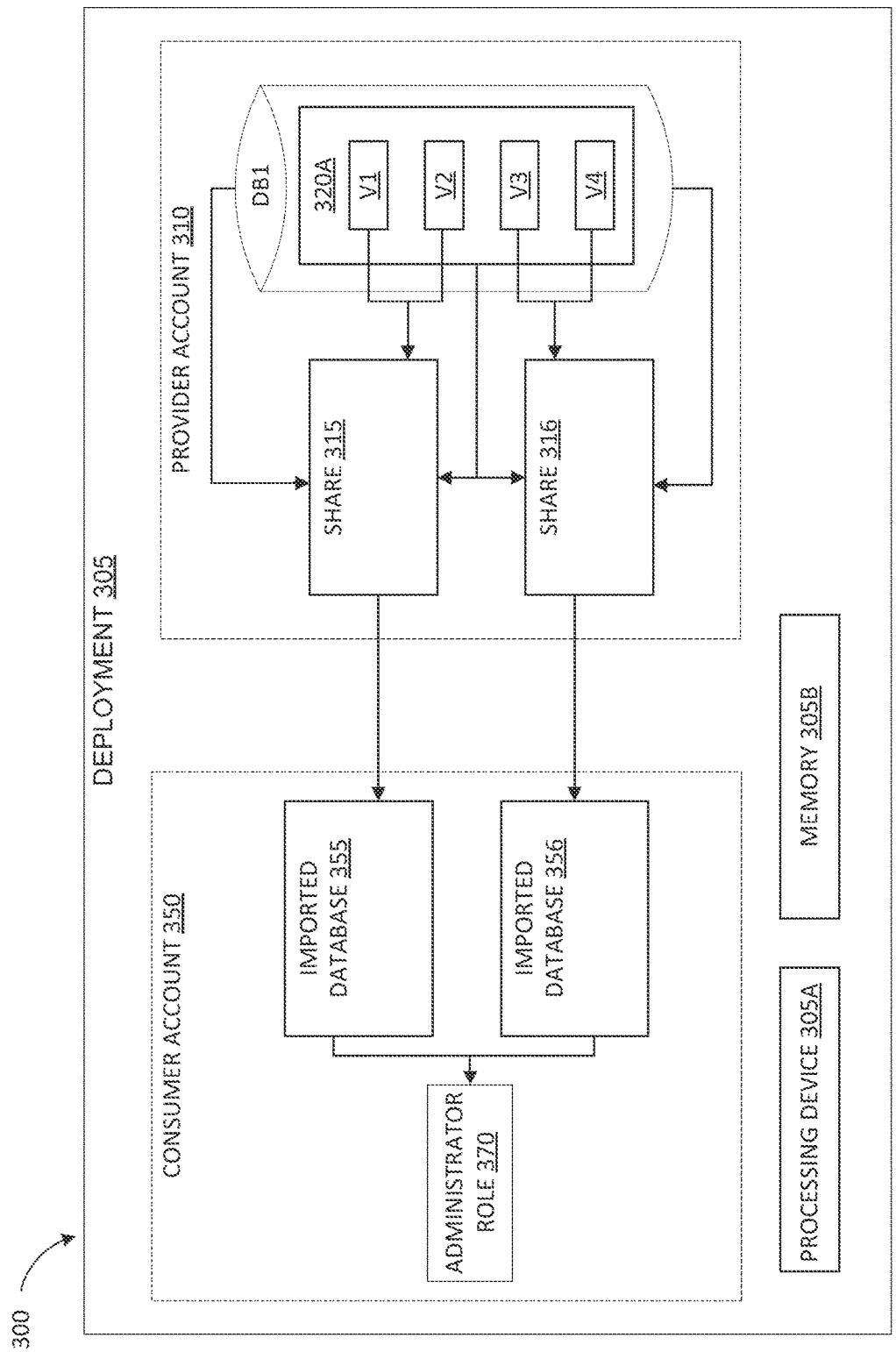
FIG. 4 is a block diagram of a deployment of a data exchange, illustrating shared object discovery techniques, in accordance with some embodiments of the present invention.
Figure 6:
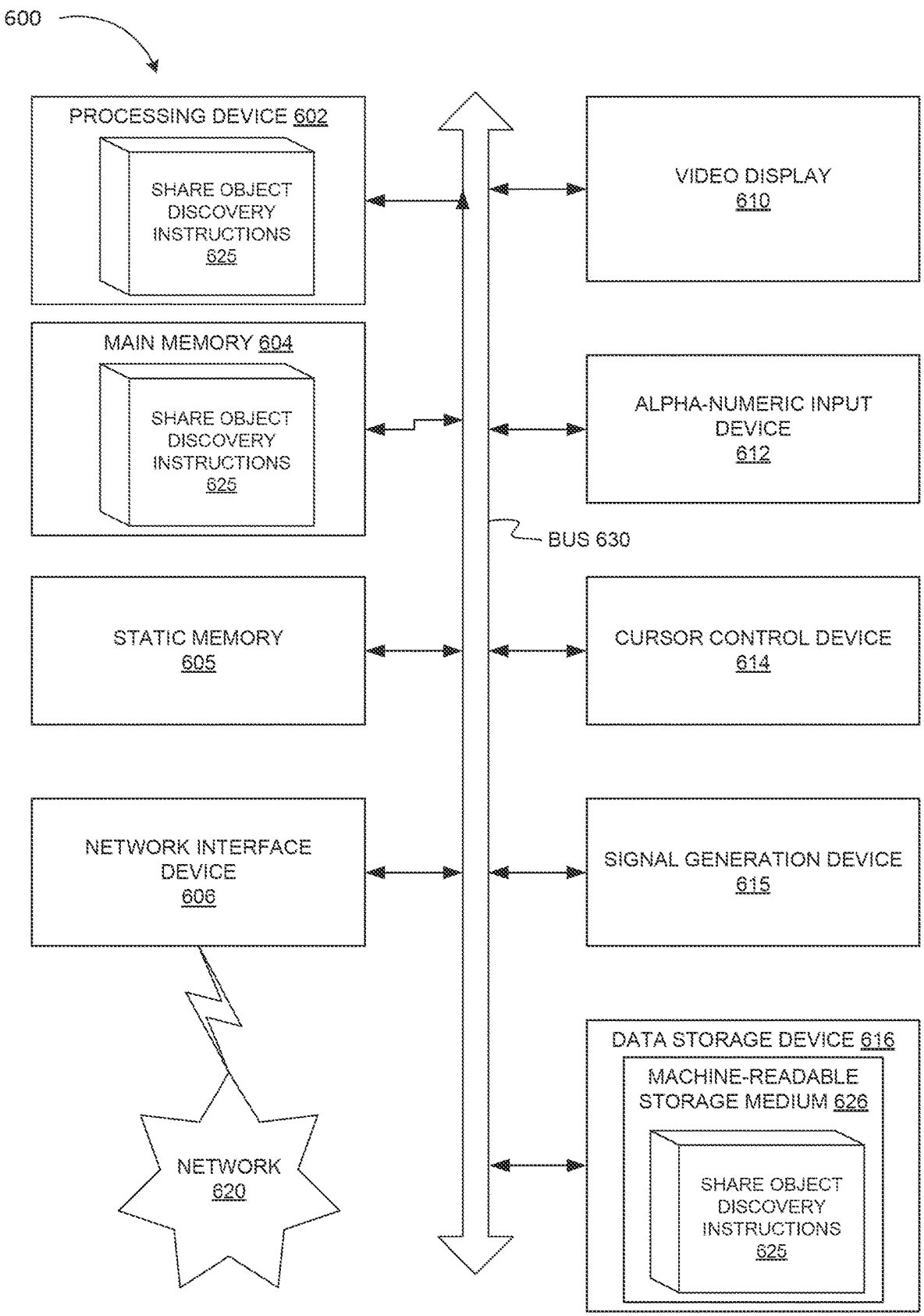
FIG. 6 is a block diagram of an example computing device that may perform one or more of the operations described herein, in accordance with some embodiments of the present invention.

Note that some listings 202 may be discoverable by users without further authentication or access permissions whereas actual accesses are only permitted after a subsequent authentication step (see discussion of FIGS. 4 and 6). The access controls 206 may specify that a listing 202 is only discoverable by specific users or classes of users.

Note also that a default function for listings 202 is that the data referenced by the share is not exportable by the consumer. Alternatively, the access controls 206 may specify that this not permitted. For example, access controls 206 may specify that secure operations (secure joins and secure functions as discussed below) may be performed with respect to the shared data such that viewing and exporting of the shared data is not permitted.

In some embodiments, once a user is authenticated with respect to a listing 202, a reference to that user (e.g., user identifier of the user's account with the virtual warehouse 131) is added to the access controls 206 such that the user will subsequently be able to access the data referenced by the listing 202 without further authentication.

The listing 202 may define one or more filters 208. For example, the filters 208 may define specific user identifiers 214 of users that may view references to the listing 202 when browsing the catalog 220. The filters 208 may define a class of users (users of a certain profession, users associated with a particular company or organization, users within a particular geographical area or country) that may view references to the listing 202 when browsing the catalog 220. In this manner, a private exchange may be implemented by the exchange manager 124 using the same components. In some embodiments, an excluded user that is excluded from accessing a listing 202, i.e. adding the listing 202 to the consumed shares 116 of the excluded user, may still be permitted to view a representation of the listing when browsing the catalog 220 and may further be permitted to request access to the listing 202 as discussed below. Requests to access a listing by such excluded users and other users may be listed in an interface presented to the provider of the listing 202. The provider of the listing 202 may then view demand for access to the listing and choose to expand the filters 208 to permit access to excluded users or classes of excluded users (e.g., users in excluded geographic regions or countries).

Filters 208 may further define what data may be viewed by a user. In particular, filters 208 may indicate that a user that selects a listing 202 to add to the consumed shares 116 of the user is permitted to access the data referenced by the listing but only a filtered version that only includes data associated with the identifier 214 of that user, associated with that user's organization, or specific to some other classification of the user. In some embodiments, a private exchange is by invitation: users invited by a provider to view listings 202 of a private exchange are enabled to do by the exchange manager 124 upon communicating acceptance of an invitation received from the provider.

In some embodiments, a listing 202 may be addressed to a single user. Accordingly, a reference to the listing 202 may be added to a set of "pending shares" that is viewable by the user. The listing 202 may then be added to a group of shares of the user upon the user communicating approval to the exchange manager 124.

The listing 202 may further include usage data 210. For example, the cloud computing service 112 may implement a credit system in which credits are purchased by a user and are consumed each time a user runs a query, stores data, or uses other services implemented by the cloud computing service 112. Accordingly, usage data 210 may record an amount of credits consumed by accessing the shared data. Usage data 210 may include other data such as a number of queries, a number of aggregations of each type of a plurality of types performed against the shared data, or other usage statistics. In some embodiments, usage data for a listing 202 or multiple listings 202 of a user is provided to the user in the form of a shared database, i.e. a reference to a database including the usage data is added by the exchange manager 124 to the consumed shares 116 of the user.

The listing 202 may also include a heat map 211, which may represent the geographical locations in which users have clicked on that particular listing. The cloud computing service 112 may use the heat map to make replication decisions or other decisions with the listing. For example, a data exchange may display a listing that contains weather data for Georgia, USA. The heat map 211 may indicate that many users in California are selecting the listing to learn more about the weather in Georgia. In view of this information, the cloud computing service 112 may replicate the listing and make it available in a database whose servers are physically located in the western United States, so that consumers in California may have access to the data. In some embodiments, an entity may store its data on servers located in the western United States. A particular listing may be very popular to consumers. The cloud computing service 112 may replicate that data and store it in servers located in the eastern United States, so that consumers in the Midwest and on the East Coast may also have access to that data.

The listing 202 may also include one or more tags 213. The tags 213 may facilitate simpler sharing of data contained in one or more listings. As an example, a large company may have a human resources (HR) listing containing HR data for its internal employees on a data exchange. The HR data may contain ten types of HR data (e.g., employee number, selected health insurance, current retirement plan, job title, etc.). The HR listing may be accessible to 100 people in the company (e.g., everyone in the HR department). Management of the HR department may wish to add an eleventh type of HR data (e.g., an employee stock option plan). Instead of manually adding this to the HR listing and granting each of the 100 people access to this new data, management may simply apply an HR tag to the new data set and that can be used to categorize the data as HR data, list it along with the HR listing, and grant access to the 100 people to view the new data set.

The listing 202 may also include version metadata 215. Version metadata 215 may provide a way to track how the datasets are changed. This may assist in ensuring that the data that is being viewed by one entity is not changed prematurely. For example, if a company has an original data set and then releases an updated version of that data set, the updates could interfere with another user's processing of that data set, because the update could have different formatting, new columns, and other changes that may be incompatible with the current processing mechanism of the recipient user. To remedy this, the cloud computing service 112 may track version updates using version metadata 215. The cloud computing service 112 may ensure that each data consumer accesses the same version of the data until they accept an updated version that will not interfere with current processing of the data set.

The exchange data 200 may further include user records 212. The user record 212 may include data identifying the user associated with the user record 212, e.g. an identifier (e.g., warehouse identifier) of a user having user data 151 in service database 128 and managed by the virtual warehouse 131.

The user record 212 may list shares associated with the user, e.g., reference listings 202 created by the user. The user record 212 may list shares consumed by the user, e.g. reference listings 202 created by another user and that have been associated to the account of the user according to the methods described herein. For example, a listing 202 may have an identifier that will be used to reference it in the shares or consumed shares 116 of a user record 212.

The exchange data 200 may further include a catalog 220. The catalog 220 may include a listing of all available listings 202 and may include an index of data from the metadata 204 to facilitate browsing and searching according to the methods described herein. In some embodiments, listings 202 are stored in the catalog in the form of JavaScript Object Notation (JSON) objects.

Note that where there are multiple instances of the virtual warehouse 131 on different cloud computing platforms, the catalog 220 of one instance of the virtual warehouse 131 may store listings or references to listings from other instances on one or more other cloud computing platforms 110. Accordingly, each listing 202 may be globally unique (e.g., be assigned a globally unique identifier across all of the instances of the virtual warehouse 131). For example, the instances of the virtual warehouses 131 may synchronize their copies of the catalog 220 such that each copy indicates the listings 202 available from all instances of the virtual warehouse 131. In some instances, a provider of a listing 202 may specify that it is to be available on only on specified one or more computing platforms 110.

In some embodiments, the catalog 220 is made available on the Internet such that it is searchable by a search engine such as BING or GOOGLE. The catalog may be subject to a search engine optimization (SEO) algorithm to promote its visibility. Potential consumers may therefore browse the catalog 220 from any web browser. The exchange manager 124 may expose uniform resource locators (URLs) linked to each listing 202. This URL may be searchable and can be shared outside of any interface implemented by the exchange manager 124. For example, the provider of a listing 202 may publish the URLs for its listings 202 in order to promote usage of its listing 202 and its brand.

Figure 3A:
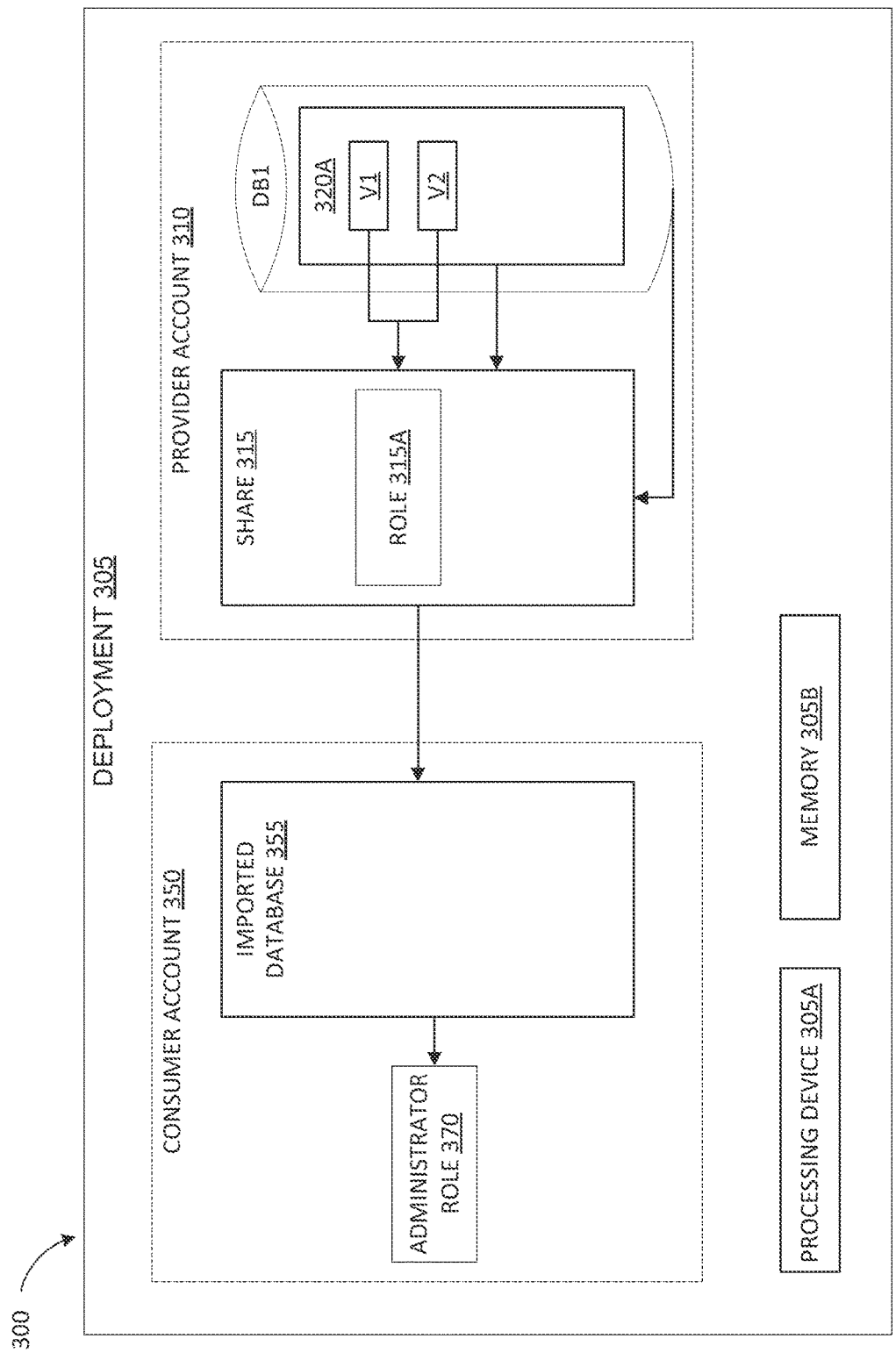
FIG. 3A is a schematic block diagram of a deployment of a data exchange that illustrates object sharing techniques, in accordance with some embodiments of the present invention.

FIG. 3A illustrates a cloud environment 300 comprising a cloud deployment 305 (shown in FIG. 3A and hereinafter referred to as deployment 305), which may comprise a similar architecture to cloud computing service 112 (illustrated in FIG. 1A) and may be a deployment of a data exchange or data marketplace. Although illustrated with a single deployment 305, the cloud environment 300 may have multiple cloud deployments which may be physically located in separate remote geographical regions but may all be deployments of a single data exchange or data marketplace. Although embodiments of the present disclosure are described with respect to a data exchange, this is for example purposes only and the embodiments of the present disclosure may be implemented in any appropriate enterprise database system or data sharing platform where data and/or applications may be shared among users of the system/platform.

The deployment 305 may include hardware such as processing device 305A (e.g., processors, central processing units (CPUs), memory 305B (e.g., random access memory (RAM), storage devices (e.g., hard-disk drive (HDD), solid-state drive (SSD), etc.), and other hardware devices (e.g., sound card, video card, etc.). A storage device may comprise a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. The deployment 305 may comprise any suitable type of computing device or machine that has a programmable processor including, for example, server computers, desktop computers, laptop computers, tablet computers, smartphones, set-top boxes, etc. In some examples, the deployment 305 may comprise a single machine or may include multiple interconnected machines (e.g., multiple servers configured in a cluster).

Databases and schemas may be used to organize data stored in the deployment 305 and each database may belong to a single account within the deployment 305. Each database may be thought of as a container having a classic folder hierarchy within it. Each database may comprise a logical grouping of schemas and a schema may comprise a logical grouping of database objects (tables, views, etc.). Each schema may belong to a single database. Together, a database and a schema may comprise a namespace. When performing any operations on objects within a database, the namespace is inferred from the current database and the schema that is in use for that particular session. If a database and schema are not in use for the session, the namespace must be explicitly specified when performing any operations on the objects. As shown in FIG. 3A, the deployment 305 may host a provider account 310 including a database DB1 having a schema 320A that includes views V1 and V2.

FIG. 3A also illustrates share-based access to objects in the provider account 310. The provider account 310 may create a share 315, which aggregates all of the data objects that are to be shared by the provider account 310. In the example of FIG. 3A, the provider account 310 may wish to share the database DB1, schema 320A, and views V1 and V2. The provider account 310 may add objects to the share 315 by leveraging role-based access control (RBAC), which enables the provider account 310 to indicate which objects are to be shared and allows specification of the type of privileges that will be granted on each specific object. More specifically, the share 315 may contain a single role 315A. Grants between role 315A and objects define what objects are being shared and with what privileges these objects are shared. The role 315A and grants may be similar to any other role and grant system in the implementation of RBAC. By modifying the set of grants attached to the role 315A in share 315, more objects may be shared (by adding grants to additional objects to the role 315A), fewer objects may be shared (by revoking grants from the role 315A), or objects may be shared with different privileges (by changing the type of grant, for example to allow write access to a shared table object that was previously read-only). For example, if role 315A has a usage grant on database DB1, it may be able to "see" this database when executing a command e.g., "show databases;" if role 315A has a select grant on a table, it can read from this table but not write to the table. Role 315A would need to have a modify grant on the table to be able to write to it. Once share 315 is populated, it may contain a list of privileges on objects that have been added to it.

After the share 315 is created, it may be imported or referenced by consumer account 350 (which has been listed in the share 315). Consumer account 350 may run a command to list all available shares for importing. Only if the share 315 was created with a reference to the consumer account 350, can the consumer account 350 reveal the share using the command to list all shares and subsequently import it. The share 315 can also be installed via the data marketplace and the listing associated with the share 315, if such a listing was created and bound to the share 315. In one embodiment, references to a share in another account are always qualified by account name. For example, consumer account 350 would reference a share SH1 in provider account A1 with the example qualified name "A1.SH1." The consumer account 350 may import the share 315 by mounting it and creating a shared database (hereinafter referred to and shown in FIG. 3A as imported database 355) therefrom, which may "project" the objects being shared via the share 315 into the consumer account 350. An administrator role 370 (e.g., an account level role) of the consumer account 350 may be given a usage grant to the imported database 355. In this way, a user in account 350 with the administrator role 370 may access data from DB1 in the provider account 310. In some embodiments, shares in provider account 310 may be imported into the target consumer account (illustrated as consumer account 350 in FIG. 3A) using alias objects and cross-account role grants.

A call context may refer to the security and naming context that an operation is executed in. A call context may comprise the account, role and the schema that is used for compiling e.g., a query (i.e., for name resolution and authorization). For example, a secure view (SAMPLE_VIEW) may be defined in account A1, owned by role R1 and located in schema S1 (database DB1), and this combination of information may be referred to as the owner's context. On the other hand, the invocation rights for the operation in turn can be granted to any other role R2 in account A2. Role R2 may call the operation from any default schema S2 (the session's default schema) using the session's default warehouse via a query such as e.g., "SELECT*FROM DB1.S1.SAMPLE_VIEW" The combination of the caller's account, role, schema and the warehouse may be referred to as the call context in this scenario. It should be noted that in FIGS. 3A-4, arrows indicate the direction in which access rights (to the object from which the arrows originate) are granted. For example, in FIG. 3A, access rights to database DB1, schema 320A, and views V1 and V2 have been granted to share 315.

At runtime, when the consumer account 350 invokes an operation involving imported database 355 (e.g., a client issues a query referencing a shared object (such as view V1), either by referencing the object directly or via a command such as SHOW), the processing device 305A will receive the name of the imported database 355 from the consumer account 350 (either as a qualifier or as the session's current database), and resolve the name to the imported database 355 by determining whether the name maps to the imported database 355. The processing device 305A may then evaluate whether the imported database 355 is linked to the share 315. If the imported database 355 is linked to the share 315, the share 315 will be discovered, and the processing device 305A will resolve the share 315 and the database DB1 that is bound to the share 315. The deployment 305 may replace the references to the imported database 355 with references to the database DB1 (the database that was shared). The processing device 305A may also update the call context to save the imported database 355 as the database linked to the share 315, and map an ID of the database DB1 to the name of the imported database 355. The deployment 305 then uses the database DB1 for all object discovery operations, and any objects found will be evaluated to ensure that the consumer account 350 is authorized to access them (and if the consumer account 350 is not authorized for a particular object(s), those objects will be ignored). In the example of FIG. 3A, the administrator role 370 may run a command to show all views within database DB1, and as part of this process the processing device 305A may determine whether the administrator role 370 is authorized to access the views V1 and V2 (i.e., determine whether the views V1 and V2 are within the administrator role 370's view hierarchy).

Figure 3B:
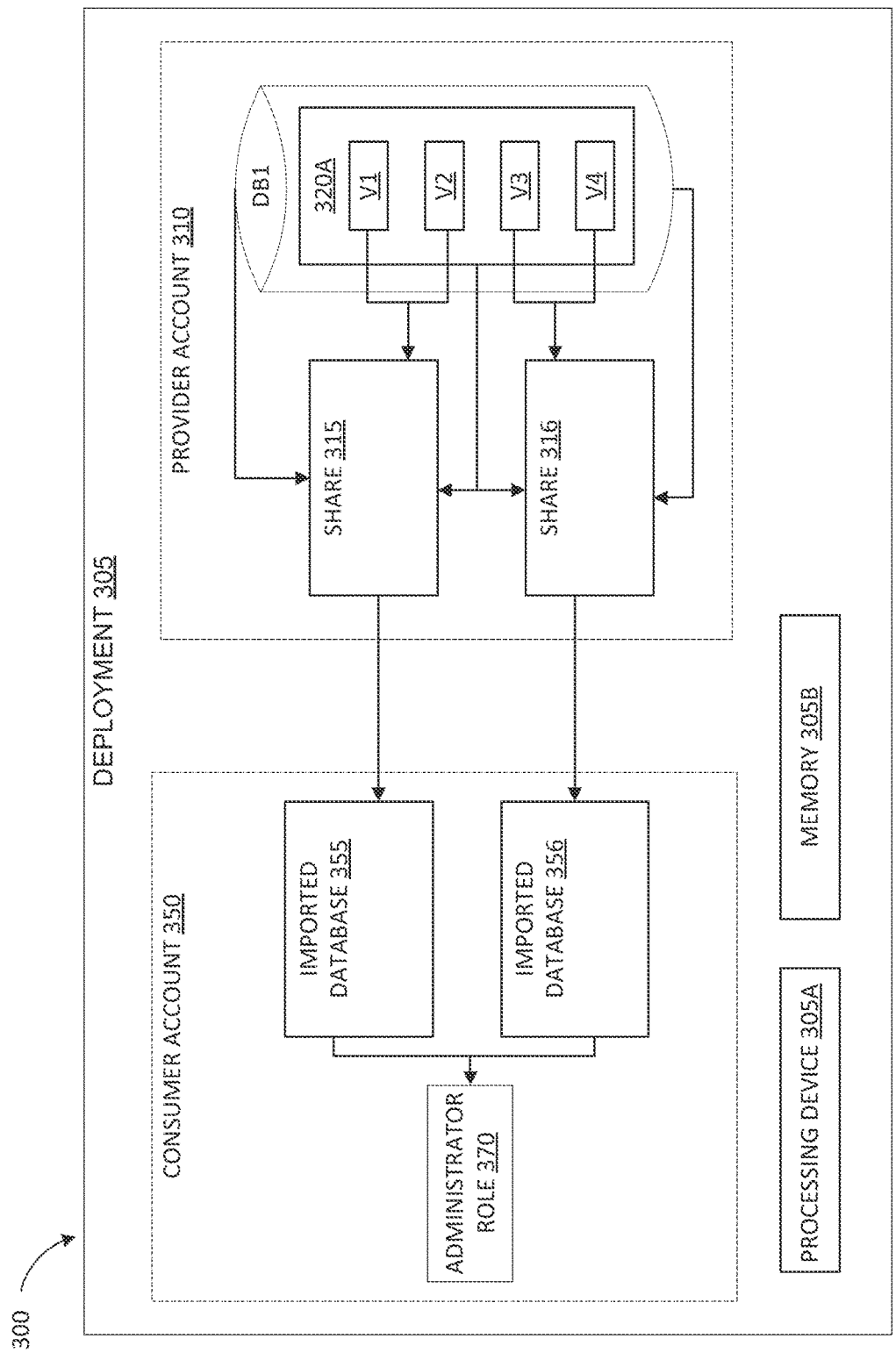
FIG. 3B is a schematic block diagram of a deployment of a data exchange that illustrates shared object discovery issues, in accordance with some embodiments of the present invention.

The above described approach to discovering shared objects works well in numerous scenarios, however there are some scenarios where it may result in errors. One example of such a scenario is illustrated in FIG. 3B, where the provider account 310 creates multiple shares 315 and 316 that are all bound to the same database DB1 and the consumer account 350 creates multiple imported databases 355 and 356 from those shares 315 and 316 respectively. In this scenario, shared objects may appear in the wrong imported database because when discovering shared objects (using commands such as SHOW), objects shared via different shares will all appear under the same local imported database bound to a given share (as the ID of database DB1 can only be mapped to a single imported database name). In addition, a share may not be authorized to access an object shared via another share and as a result, during name resolution of the object, the processing device 305A may reference the object using the wrong imported database. This occurs because the above described approach to discovering a shared object takes steps to ensure that consumer account 350 is authorized to see the object, but not that a specific share (e.g., 315 or 316) is authorized to see the object. In the example of FIG. 3B, if the consumer account 350 (e.g., via the administrator role 370) runs a command to reveal all views in the provider account 310 with imported database 355 set as the current session database, V3 and V4 would be shown as defined in the imported database 355, when they should be shown as defined in the imported database 356. In addition, during a query involving V3 or V4, it will be possible to reference those views via imported database 355, while they should only be referenced by imported database 356.

As with sharing of data, sharing of a native application (hereinafter referred to as an application) may be performed using a shared container. A provider account may define an application share (same as a standard share) and may couple a database comprising an installation script for installing the application to the application share. In some embodiments, the installation script may be in the form of a stored procedure. Stored procedures may be similar to functions in the sense that they are both evaluated as expressions. Unlike functions however, stored procedures are used via CALL statements and do not appear in other statement types the way functions do (e.g., in a SELECT or WHERE part of a query). A primary feature of stored procedures is their ability to execute other queries and access their result. As with functions, a stored procedure may be created once and then can be executed many times. Indeed, a stored procedure implemented with e.g., Javascript can be thought of as a Javascript UDF augmented with the ability to issue other queries during execution of the Javascript body.

The provider account may then grant the necessary privileges to the application share including e.g., usage on the relevant database, usage on one or more data objects (e.g., schemas, tables), and usage on the installation script. When a consumer account creates a local imported database from the application share, the deployment 305 (executing a native application framework) may trigger execution of the installation script which will build out all of the objects and procedures required for the application to run in the consumer account. The deployment 305 may utilize the local imported database to store and discover local objects (e.g., that are built out by the installation script). As a result, for native application functionality, it is desirable to maintain references to the local imported database (instead of replacing them with references to the database that was shared, and maintain the call context to preserve the local imported database as the session's current database). However, as discussed above, during the normal process of discovering shared objects, the deployment 305 replaces the references to the local imported database with references to the database that was shared, updates the call context to save the local imported database as the database that was shared, and maps an ID of the database that was shared to the name of the local imported database. As a result, the current process for discovering shared objects does not support native applications because the shared database (database DB1 in the example of FIG. 3B) is the one being used at run time for name resolution, and thus no local objects can be discovered.

Embodiments of the present disclosure provide an enhanced method of discovering shared objects that utilizes share authorization in addition to role authorization when a role is attempting to discover shared objects. A consumer account may invoke an operation referencing shared objects within a provider account using an imported database as a current session database. In response, a call context of the operation may be updated to save the imported database as the current session database and the imported database may be mapped to a first share and to a shared database. A first authorization based on whether the role has access privileges to the shared objects may be performed. The shared database may be used to identify one or more schemas and the one or more schemas may be used to identify shares to which the imported database is associated. A secondary authorization may be performed based on the permissions that the shares to which the imported database is associated have on the shared objects.

FIG. 4 illustrates the cloud environment 300 in accordance with some embodiments of the present disclosure. The consumer account 350 may invoke (e.g., via administrator role 370) an operation referencing shared objects (e.g., views V1-V4) via the imported database 355, and the processing device 305A will receive the name of the imported database 355 from the consumer account 350 (either as a qualifier or as the session's current database), and resolve the name to the imported database 355. The processing device 305A then evaluates if the imported database 355 is linked to share 315 and if yes (as is the case in the example of FIG. 4), the deployment 305 will resolve the share 315 and the database DB1 bound to the share 315. Instead of replacing the imported database 355 references with references to database DB1 and then updating the call context to save the imported database 355 as the database linked to share 315, the processing device 305A may update the call context of the operation to cache the imported database 355, which now references the database DB1 (i.e., the shared provider database). To do this, the imported database 355 will be added to the active dictionary cache and the parent ID of the imported database 355 will be added to a list of locally imported database identifiers. As discussed above, the processing device 305A may perform a first authorization to determine whether the views V1-V4 are accessible to the administrator role 370 and may determine that the views V1-V4 are accessible to the administrator role 370 even though views V3 and V4 have not been granted through share 315.

The processing device 305A may discover database level objects (e.g., schemas) based on the ID of the parent database. When discovering database level objects based on the ID of the parent database, the processing device 305A may evaluate the ID of the parent database using the list of locally imported database identifiers defined in the call context. If the ID of the database does not reference an imported database, then the database may be a local database only and database level objects will be looked up using the provided database ID of the database (not a sharing use case).

If the ID of the database references an imported database, then the processing device 305A may set an active sharing context object that will set the ID of the share associated to the imported database as the current share ID in that context, resulting in a dictionary cache tied to the share being marked as active. The idea here is to ensure that all objects discovered in the context of the share will be saved as Java instances (or any appropriate class object or similar data structure of any appropriate language), with those objects referencing as their parent the imported database Java instance instead of the provider database. During object lookup operations, for a given shared object ID, if the Java instance corresponding to that shared object ID is stored in the dictionary cache, the Java instance will be returned and will already reference as a parent the imported database Java instance (as opposed to the provider database). The schema or database role Java instances returned using the provider database, during normal lookup operations if the object is not in the dictionary cache, will be updated to have the imported database as the parent Java instance, instead of the provider database.

In the example of FIG. 4, the operation may be a command to reveal all views in the provider account 310, and the processing device 305A may resolve the imported database 355 to database DB1 in the provider account 310 (more specifically, to a Java instance of a database class corresponding to database DB1). The processing device 305A may evaluate the parent ID of the imported database 355 using the list of locally imported database identifiers defined in the call context. More specifically, the processing device 305A may determine that the parent ID of the imported database 355 references the imported database 355, and thus set an active sharing context object that will set the ID of the share 315 associated to the imported database 355 as the current share ID in that context, resulting in a dictionary cache tied to the share 315 being marked as active. This will ensure that all objects discovered in the context of the share 315 will be saved as Java instances, with those objects referencing as their parent, the imported database 355 Java instance. During object lookup operations, for a given shared object ID, the Java instance corresponding to that shared object ID is stored in the dictionary cache so the Java instance will be returned and will already reference as its parent the imported database 355 java instance (as opposed to the provider database DB1). The schema or database role Java instances returned using the provider database DB1 will be updated to have the imported database 355 as the parent Java instance, instead of the provider database DB1. In this way, the processing device 305A may reveal schemas 320A and 320B. More specifically, the processing device 305A may reveal the Java schema objects corresponding to schemas 320A and 320B.

The Java schema objects corresponding to schemas 320A and 320B may each reference (e.g., have a run time reference to) the imported database 355 (also a Java object). The processing device 305A may use the run time references to the imported database 355 to determine that each of the schemas 320A and 320B are in the sharing context. More specifically, the Java schema object corresponding to schema 320A may override the normal parent database (DB1) using its run time reference (e.g., a Java pointer) to the imported database 355. Once the processing device 305A identifies imported database 355 (the local imported database), it may derive a pointer to the share 315, which can be used by the processing device 305A to enforce a secondary authorization. More specifically, the processing device 305A may determine whether the share 315 can access views V1-V4 by obtaining all of the roles granted to share 315, and determining whether any of those roles have access to views V1-V4. In the example of FIG. 4, share 315 does not have access to views V3 and V4, and thus authorization to access views V3 and V4 will fail. In this way, the consumer account 350's command to reveal all of the views in the database DB1 may only reveal views V1 and V2, as the share 315 does not have access to views V3 and V4. It should be noted that although described with respect to a Java implementation using Java objects, embodiments of the present disclosure may be realized using any appropriate language/client.

To ensure that a share is authorized to see a shared object during name resolution or discovery of shared objects, the processing device 305A may evaluate if a sharing context is currently set. If it is, the processing device 305A will retrieve the ID of share 315 from the current sharing context and set the shareID property of the name resolution or object discovery request to the ID of share 315 (i.e., the current shareID). The processing device 305A may perform an extra authorization operation if the name resolution or object discovery request has the shareID property set, and will resolve the roles dominated by the share 315 and ensure that those roles can access the object being discovered. This will ensure that objects are properly visible in the correct share. It should be noted that none of this functionality is persisted in the backend, and all of it may comprise run time flows.

The processing device 305A may clone the Java instance of a schema 320A returned using the database DB1 to generate a new Java instance of the schema 320A, for which the parent ID will be set to the ID of the imported database 355 (as opposed to the ID of database DB1/the shared database). This cloning is required in order to prevent corruption of the dictionary cache which holds the original Java instance of the schema 320A. During SHOW commands, when discovering objects from schema 320A, the processing device 305A may use a Java instance of a schema returned from a lookup operation. The schema Java instance getParent( ) will return the local imported database in case of a shared schema: this will ensure that the correct database name is displayed.

Figure 5:
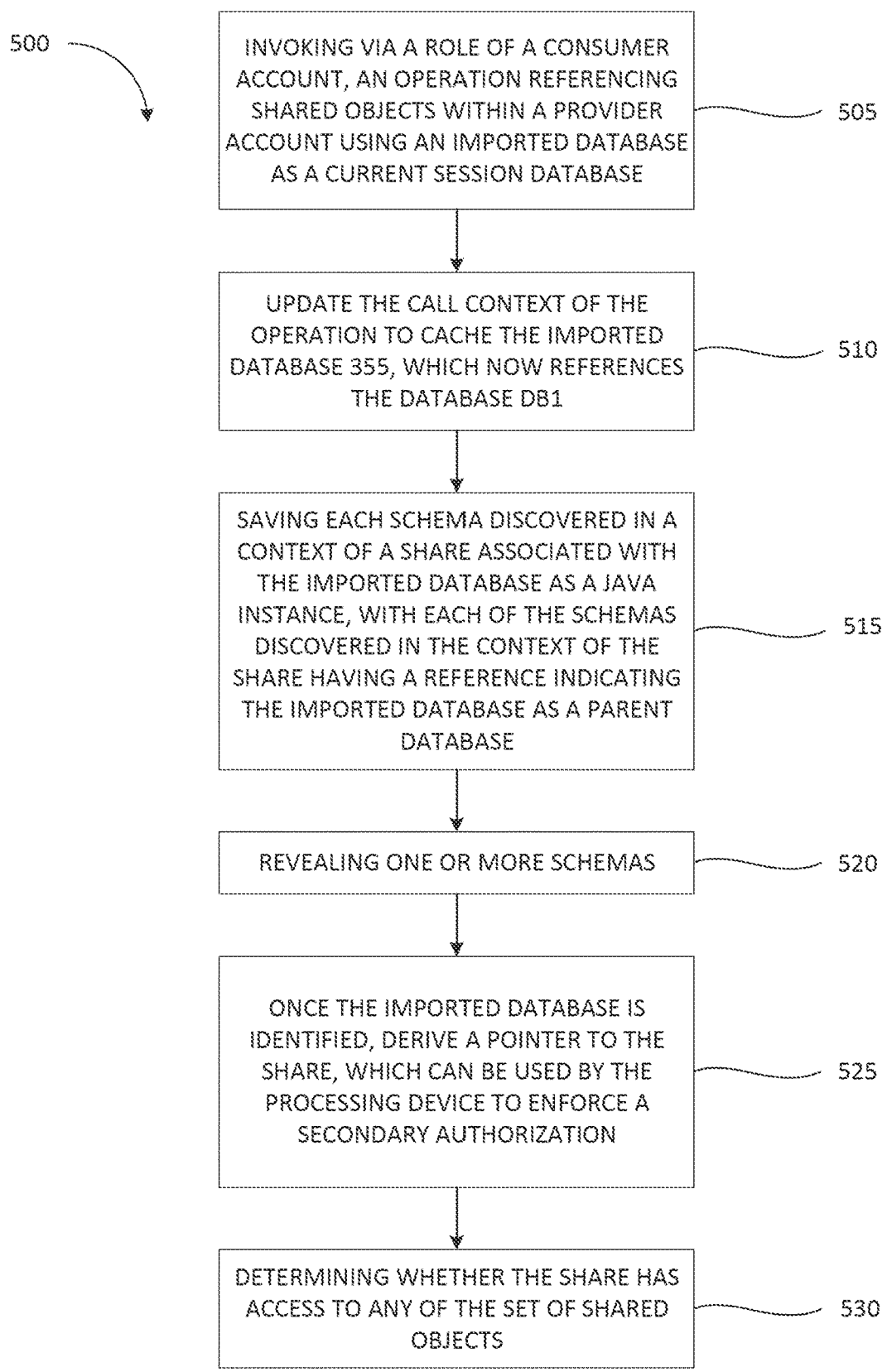
FIG. 5 is a flow diagram of a method for discovering shared objects, in accordance with some embodiments of the present invention.

FIG. 5 is a flow diagram of a method 500 for discovering shared objects of a database, in accordance with some embodiments of the present disclosure. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 500 may be performed by processing device 305A of cloud deployment 305 (illustrated in FIGS. 3A, 3B, and 4).

Referring simultaneously to FIG. 4, at block 505, the consumer account 350 may invoke (e.g., via administrator role 370) an operation referencing shared objects (e.g., views V1-V4), and the deployment 305 will receive the name of the imported database 355 from the consumer account 350 (either as a qualifier or as the session's current database), and resolve the name to the imported database 355. The deployment 305 then evaluates if the imported database 355 is linked to share 315 and if yes (as is the case in the example of FIG. 4), the deployment 305 will resolve the share 315 and the database DB1 bound to the share 315. At block 510, instead of replacing the imported database 355 references with references to database DB1 and then updating the call context to save the imported database 355 as the database linked to share 315, the processing device 305A may update the call context of the operation to cache the imported database 355, which now references the database DB1 (i.e., the shared provider database). To do this, the imported database 355 will be added to the active dictionary cache and the ID of the imported database 355 will be added to a list of locally imported database identifiers. As discussed above, the processing device 305A may perform a first authorization to determine whether the views V1-V4 are accessible to the administrator role 370 and may determine that the views V1-V4 are accessible to the administrator role 370 even though views V3 and V4 have not been granted through share 315.

In the example of FIG. 4, the operation may be a command to reveal all views in the provider account 310 with imported database 355 set as the current session database, and the processing device 305A may resolve the imported database 355 to database DB1 in the provider account 310 (more specifically, to a Java instance of a database class corresponding to database DB1). The processing device 305A may evaluate the ID of the imported database 355 using the list of locally imported database identifiers defined in the call context. More specifically, the processing device 305A may determine that the ID of the imported database 355 references the imported database 355, and thus set an active sharing context object that will set the ID of the share 315 associated to the imported database 355 as the current share ID in that context, resulting in a dictionary cache tied to the share 315 being marked as active. This will ensure that, at block 515, all objects discovered in the context of the share 315 will be saved as Java instances, with those objects referencing as their parent, the imported database 355 Java instance. During object lookup operations, for a given shared object ID, the Java instance corresponding to that shared object ID is stored in the dictionary cache so the Java instance will be returned and will already reference as its parent the imported database 355 java instance (as opposed to the provider database DB1). The schema or database role Java instances returned using the shared database DB1 will be updated to have the imported database 355 as the parent Java instance, instead of the provider database DB1. In this way, at block 520, the processing device 305A may reveal schemas 320A and 320B. More specifically, the processing device 305A may reveal the Java schema objects corresponding to schemas 320A and 320B.

The Java schema objects corresponding to schemas 320A and 320B may each reference (e.g., have a run time reference to) the imported database 355 (also a Java object). The processing device 305A may use the run time references to the imported database 355 to determine that each of the schemas 320A and 320B are in the sharing context. More specifically, the Java schema object corresponding to schema 320A may override the normal parent database (DB1) using its run time reference (e.g., a Java pointer) to the imported database 355. At block 525, once the processing device 305A identifies imported database 355 (the local imported database), it may derive a pointer to the share 315, which can be used by the processing device 305A to enforce a secondary authorization. More specifically, at block 530, the processing device 305A may determine whether the share 315 can access views V1-V4 by obtaining all of the roles granted to share 315, and determining whether any of those roles have access to views V1-V4. In the example of FIG. 4, share 315 does not have access to views V3 and V4, and thus authorization to access views V3 and V4 will fail. In this way, the consumer account 350's command to reveal all of the views in the database DB1 may only reveal views V1 and V2, as the share 315 does not have access to views V3 and V4. It should be noted that although described with respect to a Java implementation using Java objects, embodiments of the present disclosure may be realized using any appropriate language/client.

To ensure that a share is authorized to see a shared object during name resolution or discovery of shared objects, the processing device 305A may evaluate if a sharing context is currently set. If it is, the processing device 305A will retrieve the ID of share 315 from the current sharing context and set the shareID property of the name resolution or object discovery request to the ID of share 315 (i.e., the current shareID). The processing device 305A may perform an extra authorization operation if the name resolution or object discovery request has the shareID property set, and will resolve the roles dominated by the share 315 and ensure that those roles can access the object being discovered. This will ensure that objects are properly visible in the correct share. It should be noted that none of this functionality is persisted in the backend, and all of it may comprise run time flows.

FIG. 6 illustrates a diagrammatic representation of a machine in the example form of a computer system 600 within which a set of instructions, for causing the machine to perform any one or more of the methodologies discussed herein for replicating a share object to a deployment. More specifically, the machine may modify a share object of a first account into a global object wherein the share object includes grant metadata indicating share grants to a set of objects of a database. The machine may create, in a second account located in a deployment, a local replica of the share object on the deployment based on the global object and replicate the set of objects of the database to a local database replica on the deployment; and refresh the share grants to the local replica of the share object.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 600 may be representative of a server.

The exemplary computer system 600 includes a processing device 602, a main memory 604 (e.g., read-only memory (ROM), flash memory, dynamic random access memory (DRAM), a static memory 605 (e.g., flash memory, static random access memory (SRAM), etc.), and a data storage device 616, which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computing device 600 may further include a network interface device 606 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 615 (e.g., a speaker). In one embodiment, video display unit 610, alphanumeric input device 612, and cursor control device 614 may be combined into a single component or device (e.g., an LCD touch screen).

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute shared object discovery instructions 625, for performing the operations and steps discussed herein.

The data storage device 618 may include a machine-readable storage medium 628, on which is stored one or more sets of shared object discovery instructions 625 (e.g., software) embodying any one or more of the methodologies of functions described herein. The shared object discovery instructions 625 may also reside, completely or at least partially, within the main memory 604 or within the processing device 602 during execution thereof by the computer system 600; the main memory 604 and the processing device 602 also constituting machine-readable storage media. The shared object discovery instructions 625 may further be transmitted or received over a network 620 via the network interface device 608.

The machine-readable storage medium 626 may also be used to store instructions to perform a method for determining functions to compile, as described herein. While the machine-readable storage medium 626 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Unless specifically stated otherwise, terms such as "receiving," "routing," "granting," "determining," "publishing," "providing," "designating," "encoding," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned (including via virtualization) and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams or flow diagrams, and combinations of blocks in the block diagrams or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
invoking, via a role of a consumer account, an operation referencing a set of shared objects stored within a database of a provider account using an imported database of the consumer account that makes the set of shared objects available within the consumer account;
updating, by a processing device, a call context of the operation to save the imported database as a current database used to resolve the operation, wherein the imported database references a share created from the database of the provider account, the share having grants to the set of shared objects, and wherein the call context comprises a role used to resolve the operation, a virtual warehouse used to resolve the operation, the current database, and a schema used to resolve the operation;
discovering one or more database level objects in a context of the share referenced by the imported database;
obtaining each role granted to the share based on the one or more database level objects;
saving each of the one or more database level objects as a class object that includes a reference to the imported database as a database from which the database level object originated;

using the reference of each of the one or more database level objects to obtain each role granted to the share;
determining whether any role granted to the share has access to any of the set of shared objects; and
executing the operation for each of the set of shared objects to which any role granted to the share has access.

2. The method of claim 1, further comprising:
setting an active sharing context object such that an identifier (ID) of the share referenced by the imported database is set as a current share ID to mark a dictionary cache tied to the share as active.

3. The method of claim 2, wherein updating the call context of the operation comprises:
adding the imported database to the active dictionary cache; and
adding a parent identifier (ID) of the imported database to a list of locally imported database identifiers.

4. The method of claim 3, wherein during an object lookup operation, if a first class object corresponding to a database level object of the one or more database level objects is stored in the active dictionary cache, the first class object is returned and references as a database from which the first class object originated, the imported database.

5. The method of claim 2, wherein using the reference of each of the database level objects to obtain each role granted to the share comprises:
determining that each of the one or more database level objects is in a sharing context;
identifying the imported database; and
deriving a pointer to the share, wherein the pointer is used to obtain each role granted to the share.

6. The method of claim 1, wherein the operation is an operation to reveal the set of shared objects within the provider account.

7. The method of claim 1, wherein the set of shared objects within the provider account comprise a set of views.

8. The method of claim 1, wherein the set of shared objects within the provider account comprise one or more native applications.

9. The method of claim 1, wherein the class object is a Java instance.

10. A system comprising:
a memory; and
a processing device operatively coupled to the memory, the processing device to:
invoke, via a role of a consumer account, an operation referencing a set of shared objects stored within a database of a provider account using an imported database of the consumer account that makes the set of shared objects available within the consumer account;
update a call context of the operation to save the imported database as a current database used to resolve the operation, wherein the imported database references a share created from the database of the provider account, the share having grants to the set of shared objects, and wherein the call context comprises a role used to resolve the operation, a virtual warehouse used to resolve the operation, the current database, and a schema used to resolve the operation;
discover one or more database level objects in a context of the share referenced by the imported database;
save each of the one or more database level objects as a class object that includes a reference to the imported database as a database from which the database level object originated;
use the reference of each of the one or more database level objects to obtain each role granted to the share;
determine whether any role granted to the share has access to any of the set of shared objects; and
execute the operation for each of the set of shared objects to which any role granted to the share has access.

11. The system of claim 10, wherein the processing device is further to:
set an active sharing context object such that an identifier (ID) of the share referenced by the imported database is set as a current share ID to mark a dictionary cache tied to the share as active.

12. The system of claim 11, wherein to update the call context of the operation, the processing device is to:
add the imported database to the active dictionary cache; and
add a parent identifier (ID) of the imported database to a list of locally imported database identifiers.

13. The system of claim 12, wherein during an object lookup operation, if a first class object corresponding to a database level object of the one or more database level objects is stored in the active dictionary cache, the first class object is returned and references as a database from which the first class object originated, the imported database.

14. The system of claim 11, wherein to use the reference of each of the database level objects to obtain each role granted to the share, the processing device is to:
determine that each of the one or more database level objects are in a sharing context;
identify the imported database; and
derive a pointer to the share, wherein the pointer is used to obtain each role granted to the share.

15. The system of claim 10, wherein the operation is an operation to reveal the set of shared objects within the provider account.

16. The system of claim 10, wherein the set of shared objects within the provider account comprise a set of views.

17. The system of claim 10, wherein the set of shared objects within the provider account comprise one or more native applications.

18. The system of claim 10, wherein the class object is a Java instance.

19. A non-transitory computer-readable medium having instructions stored thereon which, when executed by a processing device, cause the processing device to:
invoke, via a role of a consumer account, an operation referencing a set of shared objects stored within a database of a provider account using an imported database of the consumer account that makes the set of shared objects available within the consumer account;
update, by the processing device, a call context of the operation to save the imported database as a current database used to resolve the operation, wherein the imported database references a share created from the database of the provider account, the share having grants to the set of shared objects, and wherein the call context comprises a role used to resolve the operation, a virtual warehouse used to resolve the operation, the current database, and a schema used to resolve the operation;
discover one or more database level objects in a context of the share referenced by the imported database;
save each of the one or more database level objects as a class object that includes a reference to the imported database as a database from which the database level object originated;

use the reference of each of the one or more database level objects to obtain each role granted to the share;

determine whether any role granted to the share has access to any of the set of shared objects; and execute the operation for each of the set of shared objects to which any role granted to the share has access.

20. The non-transitory computer-readable medium of claim 19, wherein the processing device is further to:

set an active sharing context object such that an identifier (ID) of the share referenced by the imported database is set as a current share ID to mark a dictionary cache tied to the share as active.

21. The non-transitory computer-readable medium of claim 20, wherein to update the call context of the operation, the processing device is to:

add the imported database to the active dictionary cache; and add a parent identifier (ID) of the imported database to a list of locally imported database identifiers.

22. The non-transitory computer-readable medium of claim 21, wherein during an object lookup operation, if a first class object corresponding to a database level object of the one or more database level objects is stored in the active dictionary cache, the first class object is returned and references as a database from which the first class object originated, the imported database.

23. The non-transitory computer-readable medium of claim 20, wherein to use the reference of each of the database level objects to obtain each role granted to the share, the processing device is to:

determine that each of the one or more database level objects are in a sharing context;

identify the imported database; and derive a pointer to the share, wherein the pointer is used to obtain each role granted to the share.

24. The non-transitory computer-readable medium of claim 19, wherein the operation is an operation to reveal the set of shared objects within the provider account.

25. The non-transitory computer-readable medium of claim 19, wherein the set of shared objects within the provider account comprise a set of views.

26. The non-transitory computer-readable medium of claim 19, wherein the set of shared objects within the provider account comprise one or more native applications.

27. The non-transitory computer-readable medium of claim 19, wherein the class object is a Java instance.

* * * * *